(12) United States Patent
Deters et al.

(10) Patent No.: US 8,220,984 B2
(45) Date of Patent: Jul. 17, 2012

(54) APPARATUS FOR PRODUCING A MIXTURE COMPOSED OF VARIOUS BULK MATERIAL COMPONENTS

(75) Inventors: Martin Deters, Bissendorf (DE); Wolfgang Schäfer, Löhne (DE)

(73) Assignee: INOEX GmbH (DE)

( * ) Notice: Subject to any disclaimer, the term of this patent is extended or adjusted under 35 U.S.C. 154(b) by 1033 days.

(21) Appl. No.: 12/093,241

(22) PCT Filed: Nov. 13, 2006

(86) PCT No.: PCT/DE2006/001981
§ 371 (c)(1),
(2), (4) Date: May 9, 2008

(87) PCT Pub. No.: WO2007/054084
PCT Pub. Date: May 18, 2007

(65) Prior Publication Data
US 2008/0267004 A1  Oct. 30, 2008

(30) Foreign Application Priority Data
Nov. 11, 2005  (DE) .......................... 10 2005 054 253

(51) Int. Cl.
*B01F 15/02* (2006.01)

(52) U.S. Cl. ..................................... 366/141

(58) Field of Classification Search .................. 366/341, 366/141
See application file for complete search history.

(56) References Cited

U.S. PATENT DOCUMENTS

| | | | |
|---|---|---|---|
| 4,254,699 A * | 3/1981 | Skinner et al. | 99/516 |
| 4,381,703 A * | 5/1983 | Crimmins et al. | 99/516 |
| 4,459,028 A * | 7/1984 | Bruder et al. | 366/141 |
| 4,747,690 A * | 5/1988 | Hayashi | 366/98 |
| 4,790,665 A * | 12/1988 | Hayashi | 366/98 |
| 5,340,210 A * | 8/1994 | Patel et al. | 366/132 |
| 5,558,435 A * | 9/1996 | Marjo | 366/141 |
| 6,057,514 A * | 5/2000 | Maguire | 177/105 |
| 2003/0142580 A1* | 7/2003 | Maguire | 366/76.6 |
| 2008/0267004 A1* | 10/2008 | Deters et al. | 366/141 |

FOREIGN PATENT DOCUMENTS

| | | |
|---|---|---|
| DE | 70 26 426 | 1/1971 |
| DE | 196 14 688 | 10/1997 |
| EP | 507689 A2 * | 10/1992 |
| EP | 0 789 617 | 2/2001 |

OTHER PUBLICATIONS

Preliminary Search report, PCT ISA 237, for PCT/DE2006/001981, dated Jun. 2008, 10 pages.*

* cited by examiner

*Primary Examiner* — Tony G SooHoo
(74) *Attorney, Agent, or Firm* — Robert Becker; Robert Becker & Assoc

(57) ABSTRACT

An apparatus for producing a mixture of various bulk materials, comprising a weighing device that is carried by the framework of the apparatus. A weighing container is suspended or supported by the weighing device, and is adapted to receive a desired mixture of bulk material components from supply containers via an upper inlet. A mixing device extends from above into the weighing container and is driven by motor-transmission means that is mounted on the framework and is gravimetrically separate from the weighing container. The mixing device is permanently suspended on the motor-transmission means free of the weighing container.

4 Claims, 2 Drawing Sheets

US 8,220,984 B2

APPARATUS FOR PRODUCING A MIXTURE COMPOSED OF VARIOUS BULK MATERIAL COMPONENTS

BACKGROUND OF THE INVENTION

The instant application should be granted the priority dates of Nov. 11, 2005, the filing date of the corresponding German patent application 10 2005 054 253.0, as well as Nov. 13 2006, the filing date of the International patent application PCT/DE2006/001981.

The present invention relates to an apparatus for producing a mixture composed of various loose or bulk material components.

Conventional charge mixers have weighing containers and mixing containers which are separate from one another, with a charge in the weighing container being emptied, after it has been weighed, into the mixing container arranged underneath it. The mixing container contains mixing members which are driven by one or more motors and mix the bulk material components with one another. The complete mixture is then passed on for further processing, for example in an extruder. In addition to the increased hardware complexity, this prior art has the disadvantage of the physical height, which is relatively large, since the weighing container is arranged above the mixing container.

Known apparatuses overcome this by integrating the mixing device in the weighing container, for example as is known from EP 0 789 617 B1 and DE 196 14 688 C2. This solution therefore has no separate mixing container, thus reducing the physical height and reducing the hardware complexity. However, these solutions have the disadvantage that the mixing device, in this case in particular the drive motor together with the weighing container, is suspended on the weighing device, and/or is supported on it. This has a negative influence on the ratio of the empty weight of the weighing container to the items being weighed, thus resulting in measurement errors. A further disadvantage of the apparatuses known from DE 196 14 688 C2 and EP 0 789 617 B1 is that the weighing container must be caused to oscillate in order to mix the charge located in it, thus likewise increasing the hardware complexity.

DE 70 26 426 U discloses an apparatus of this generic type in which the mixing device projects into the weighing container from above. The mixing device is driven by a motor which is mounted, gravimetrically separately from the weighing container, on a framework of the apparatus. The motor and the mixing apparatus are connected by a claw clutch. During the mixing phase, the motor is connected via the claw clutch to the mixing device, while the claws of the claw clutch assume a position without any force and contact during the weighing phase. The mixing device is therefore gravimetrically separated from the motor during the weighing phase.

This apparatus has the advantage over the other known apparatuses that the drive unit for the mixing device is not also weighed, therefore improving the ratio of the empty weight of the weighing container to the items being weighed, in order to increase the measurement accuracy.

The object of the present invention is to provide an apparatus of this generic type in which the ratio of the empty weight of the weighing container to the items being weighed is improved even further, in order to increase the measurement accuracy.

SUMMARY OF THE INVENTION

According to the invention, this object is realized by an apparatus which has a weighing device carried by a framework; a weighing container suspended or supported by the weighing device; supply containers for individual bulk material components, wherein the weighing container has an upper inlet adapted to receive a desired mixture of the bulk material components from the supply containers; a mixing device that extends from above into the weighing container and motor-transmission means for driving the mixing device; wherein the motor-transmission means is mounted on the framework and is gravimetrically separate from the weighing container, and wherein the mixing device is permanently suspended on the motor-transmission means free of the weighing container.

Therefore, in the case of the apparatus according to the invention, the weighing container and the mixing device which is integrated in it are gravimetrically separated from one another in that the mixing device, which projects into the weighing container from above, is suspended separately from the weighing container, and is therefore not included in the weighing device. The ratio of the empty weight of the weighing container to the items being weighed is therefore considerably less than in the case of the prior art, thus resulting in an increase in the measurement accuracy.

BRIEF DESCRIPTION OF THE DRAWINGS

Further advantageous refinements of the invention are specified in the dependent claims. The invention will be explained in more detail in the following text with reference to one exemplary embodiment. In the associated drawing:

DESCRIPTION OF PREFERRED EMBODIMENTS

Figure 1:
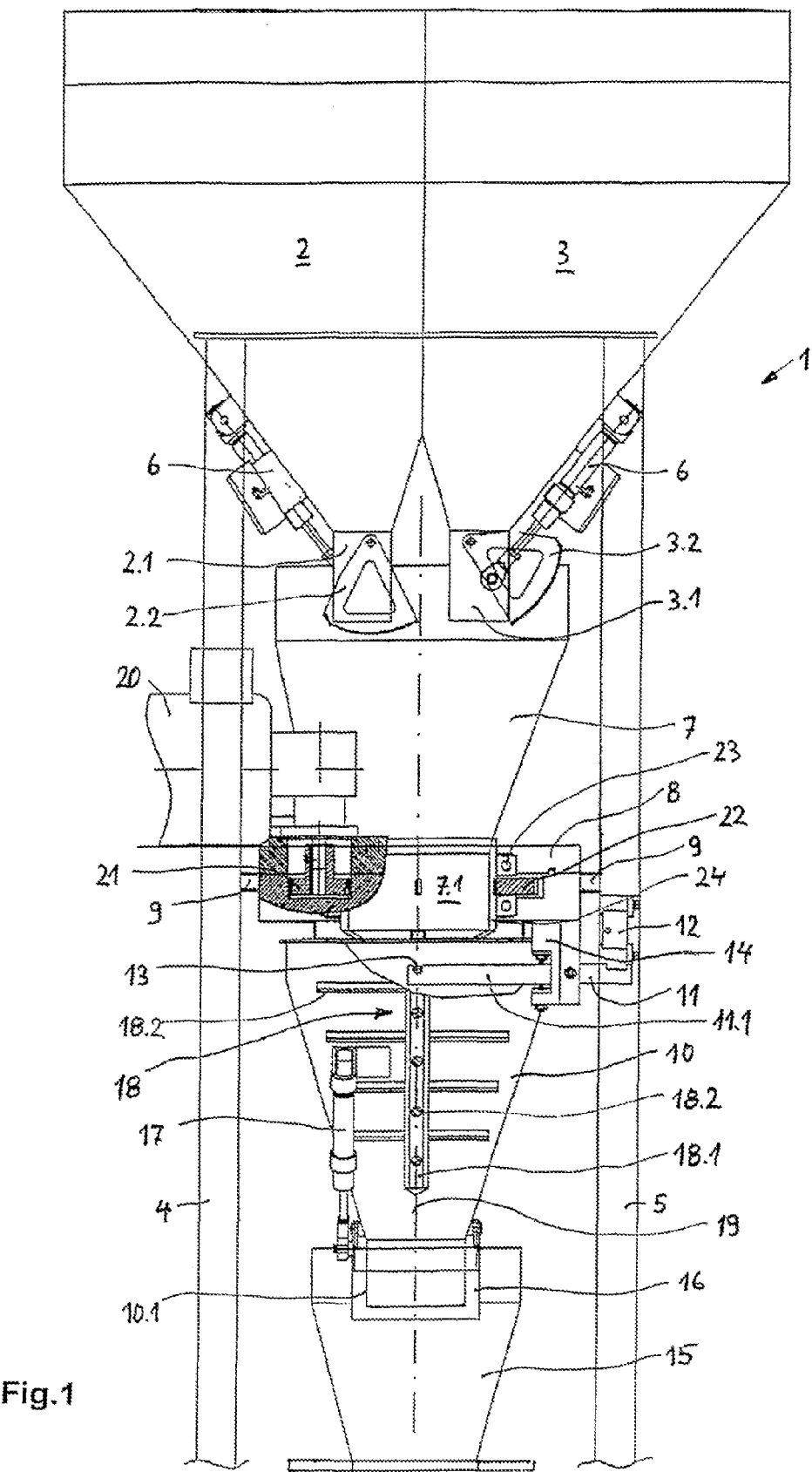
FIG. 1 shows a schematic side view of an apparatus according to the invention.
Figure 2:
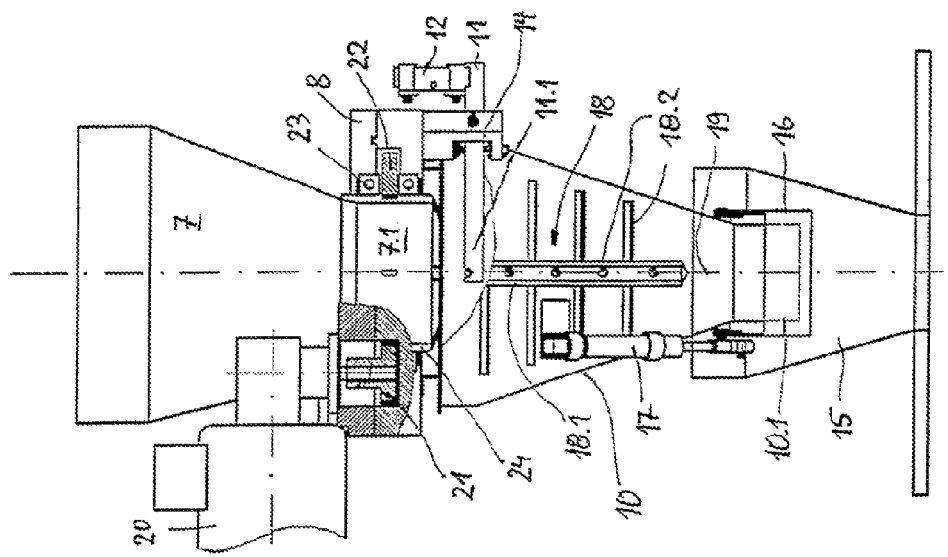
FIG. 2 shows a detailed illustration of the weighing container of the apparatus shown in FIG. 1, with the integrated mixing device and the inlet and outlet funnels.
Figure 3:
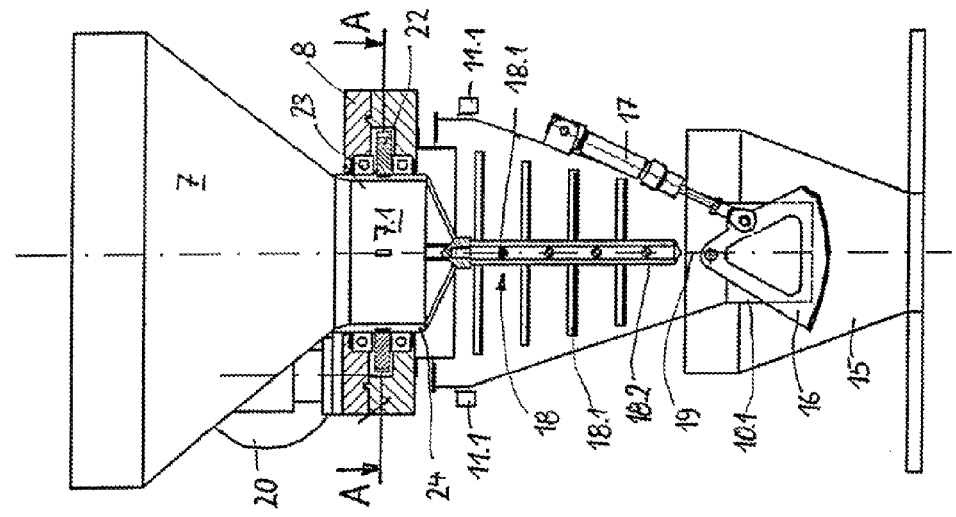
FIG. 3 shows a front view of the illustration shown in FIG. 2.
Figure 4:
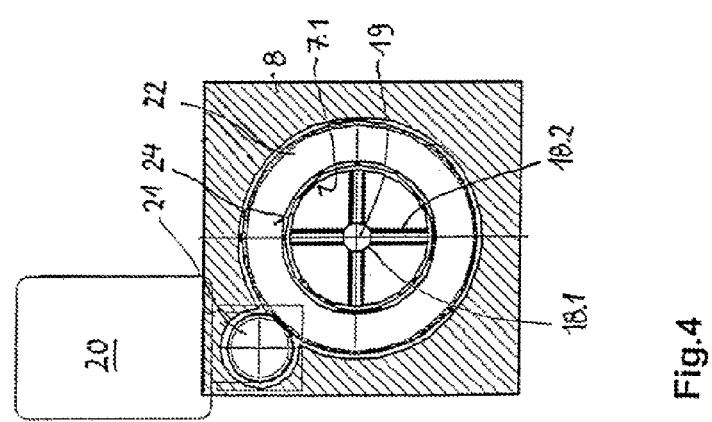
FIG. 4 shows a section A-A as shown in FIG. 3.

The overall view, as shown in FIG. 1, of an apparatus 1 according to the invention shows two supply containers 2 and 3 for a respective bulk material component, which are supported by a plurality of supports of a framework, of which only the supports 4 and 5 can be seen in FIG. 1. Depending on the number of bulk material components to be mixed, even more supply containers, with respect to the illustration shown in FIG. 1, can be arranged behind the supply containers 2 and 3. In order to make it easier for the bulk material components to flow out of the supply containers 2 and 3 by the force of gravity, their walls are in the form of funnels, at least in the area of their outlets 2.1 and 3.1. The outlets 2.1 and 3.1 are in the form of tubular connecting stubs, which can be closed at their end by a blade-like bottom flap 2.2 or 3.2, respectively. The bottom flaps 2.2 and 3.2 can be operated by piston and cylinder units 6 which, for example, are operated pneumatically. The piston and cylinder units 6 are each attached to one wall of the supply containers 2 and 3.

The outlets 2.1 and 3.1 of the supply containers 2 and 3 open into an inlet funnel 7 which is open at the top and is supported at its lower end on a platform 8. This platform 8 is rigidly connected via side struts 9, which are illustrated only symbolically, to the supports 4 and 5, and further supports, which are not illustrated, for the framework of the apparatus 1. The outlet 7.1 of the inlet funnel 7 is likewise once again in the form of a tubular connecting stub which passes downwardly through the platform 8.

The outlet 7.1 of the inlet funnel 7 opens into a weighing container 10, which is open at the top and is in the form of a funnel, that is to say it tapers downwardly from the top. The weighing container 10 is suspended in a known manner via a fork 11 on a bending rod 12, which is itself mounted on the framework of the apparatus 1. The fork arms 11.1 clasp or extend about the weighing container 10 on its circumference, with the weighing container 10 having bolts 13 which project sideways there at the height of its center axis 19, by means of which it is hooked into corresponding cutouts, which are open at the top, in the fork arms 11.1. The fork arms 11.1 are guided in an overload protection means 14, which is intended to prevent excessive loading of the bending rod 12.

The outlet of the weighing container 10 is in the form of a tubular connecting stub 10.1 and projects freely into an outlet funnel 15 which is itself supported on a processing machine that is not illustrated, for example an extruder or else on a feed device which feeds the complete mixture to a processing machine. Like the supply containers 2 and 3, the outlet 10.1 of the weighing container 10 can likewise be closed by a blade-like bottom plate 16, which can be operated by means of a piston and cylinder unit 17 which is attached to one wall of the weighing container 10.

The platform 8 is rigidly connected to the framework of the apparatus 1 and is fitted with or supports a mixing device 18, which comprises a mixing shaft 18.1 and mixing arms 18.2 which project radially from it and whose length decreases downwardly from the top, matching the walls of the weighing container 10. In the installed state, the mixing device 18 projects from the top into the weighing container 10, with its mixing shaft 18.1 lying on the center axis 19 of the weighing container 10.

The mixing device 18 is driven by an electric motor 20 which is mounted in the platform 8. A pinion 21 is seated on the motor shaft so that they rotate together, and engages with a toothed ring 22 which is mounted in ball bearings 23 in the platform 8 and is connected to a hollow cylindrical section 24, such that they rotate together, which hollow cylindrical section 24 concentrically surrounds the outlet 7.1 of the inlet funnel 7, and can rotate freely around it. The mixing shaft 18.1 of the mixing device 18 is connected via holding arms 25 to the hollow cylindrical section 24, such that they rotate together.

In the arrangement described above, the mixing device 18 is suspended on the platform 8, which is also fitted with the overall drive for the mixing device 18, that is to say the electric motor 20, as well as the transmission means, the pinion 21 and the toothed ring 22. These components therefore do not load the bending bar 12, so that, in addition to the items being weighed, this records only the empty weight of the weighing container 10, of the cylinder and piston unit 17 and the bottom flap 16. Dead spaces are avoided by the arrangement of the mixing device 18, since it projects axially from above into the weighing container 10. The funnel shape of the weighing container 10, which acts as the mixing container at the same time, ensures that mixed charge can flow out without any residue into the outlet funnel 15 once the bottom flap 16 has been opened. The arrangement according to the invention also ensures easy accessibility to the mixing device 18, since the weighing container 10 can simply be suspended from the fork arms 11.1.

The specification incorporates by reference the disclosure of German 10 2005 054 253.0 filed Nov. 11, 2006 as well as International application PCT/DE2006/001981 filed Nov. 13, 2006.

The present invention is, of course, in no way restricted to the specific disclosure of the specification and drawings, but also encompasses any modifications within the scope of the appended claims.

The invention claimed is:

1. An apparatus for producing a mixture of various bulk materials, comprising:
    a framework;
    a weighing device carried by said framework;
    a weighing container that is suspended or supported by said weighing device;
    supply containers for individual bulk material components, wherein said weighing container has an upper inlet adapted to receive a desired mixture of the bulk material components from said supply containers;
    a mixing device that extends from above into said weighing device;
    motor-transmission means for driving said mixing device, wherein said motor-transmission means is mounted on said framework and is gravimetrically separate from said weighing container, and wherein said mixing device is permanently suspended on said motor-transmission means free of said weighing container;
    a platform secured to said framework independently of said weighing container;
    a pipe inlet connection stub disposed between said supply containers and said upper inlet of said weighing container; and
    a hollow cylindrical section rotatably drivingly mounted in said platform wherein said hollow cylindrical section concentrically surrounds said pipe inlet
    and wherein said mixing device is rigidly suspended on said hollow cylindrical section.

2. An apparatus according to claim 1 wherein said platform also supports said motor-transmission means for driving said mixing device.

3. An apparatus according to claim 2, wherein said motor-transmission means includes a motor, a pinion mounted on a shaft of said motor, and a toothed ring that engages said pinion, and wherein said hollow cylindrical section is connected on its periphery to said toothed ring so as to rotate together therewith.

4. An apparatus according to claim 1, wherein said weighing device comprises a bending rod that is mounted on said framework and a fork that is connected to said bending rod, and wherein said weighing container is suspended on said fork.

\* \* \* \* \*